(12) United States Patent
Loyer et al.

(10) Patent No.: US 7,647,200 B2
(45) Date of Patent: Jan. 12, 2010

(54) MONITORING MOTION OF A CRUSHER

(75) Inventors: Harold B. Loyer, Bethlehem, PA (US);
Mark Solomon, Bethlehem, PA (US)

(73) Assignee: FLSmidth Inc, Bethlehem, PA (US)

( * ) Notice: Subject to any disclaimer, the term of this patent is extended or adjusted under 35 U.S.C. 154(b) by 37 days.

(21) Appl. No.: 12/082,911

(22) Filed: Apr. 15, 2008

(65) Prior Publication Data
US 2009/0259434 A1   Oct. 15, 2009

(51) Int. Cl.
*G01B 21/16* (2006.01)
(52) U.S. Cl. .......................... 702/159; 73/593; 241/30; 250/231.14
(58) Field of Classification Search ................ 702/113, 702/145, 159, 182; 73/460, 462, 593; 250/231.14; 241/30, 37, 101.3
See application file for complete search history.

(56) References Cited

U.S. PATENT DOCUMENTS

| | | | | |
|---|---|---|---|---|
| 4,566,638 | A * | 1/1986 | Lundin et al. | ................. 241/37 |
| 4,793,560 | A * | 12/1988 | Schrodl | ....................... 241/30 |
| 6,426,497 | B1 * | 7/2002 | Martinez et al. | ....... 250/231.14 |
| 6,874,364 | B1 * | 4/2005 | Campbell et al. | ............. 73/593 |

* cited by examiner

*Primary Examiner*—John H Le
(74) *Attorney, Agent, or Firm*—Daniel DeJoseph; Aaron Pile

(57) ABSTRACT

A method of measuring one or more motion parameters of a main shaft in a gyratory or cone crusher is disclosed. Signals are directed from a stationary sensor means located apart from the main shaft to one or more signal reflective surfaces situated on a target located on or adjacent to an upper portion of the main shaft. The target rotates and otherwise moves in unison with the movement of the main shaft. From the elapsed time the distances from the sensor the reflective surfaces on the target are determined. Analyzing the distances over time will yield information on the movement of the main shaft.

21 Claims, 2 Drawing Sheets

MONITORING MOTION OF A CRUSHER

This invention relates to cone and gyratory crushers. More specifically, the invention relates to a method and system for monitoring the position and the rpm of the main shaft of a cone or gyratory crusher and a crusher in which the invention is implemented. In one preferred embodiment, the invention relates to a method of monitoring the rotational speed and height of the main shaft of a cone or gyratory crusher by using a single sensor means that produces a single set of data. The data is interpreted by a processing means. The single sensor means can also be utilized to determine the direction of rotation of the main shaft and any change in the tilt of the main shaft.

BACKGROUND OF THE INVENTION

Crushers are used to crush large particles (e.g., rocks) into smaller particles. One particular type of crusher is known as a gyratory crusher, which for the purposes of this invention also incorporates cone crushers. Typically such a crusher includes a frame supporting a head and a mantle secured to the head. A bowl and bowl liner are supported by the frame so that an annular space is formed between the bowl liner and the mantle. In operation, large particles are fed into the annular space between the bowl liner and the mantle. The head, and the mantle mounted on the head, gyrate about an axis, causing the annular space to vary. As the distance between the mantle and the bowl liner varies, the large particles are compressed between the mantle and the bowl liner. The particles are crushed and reduced to the desired product size, and then dropped down from between the mantle and the bowl liner.

In such crushers there is an eccentric assembly with an oblique (inclined and offset) inner bore. In the bore is fitted a main shaft separated from the eccentric by an eccentric bushing. The main shaft is, like the eccentric, also positioned at a slight angle to the vertical. A crushing head is attached to the main shaft. When the eccentric shaft is rotated, the main shaft together with the head moves in a pendulum motion and rotates due to the frictional forces between the bushing and the shaft. The main shaft typically rotates at about 10% of the rate that the eccentric rotates. In addition, the main shaft of a rotates at about 10% of the rate that the eccentric rotates. In addition, the main shaft of a gyratory crusher is usually adjustable by a hydraulic system whereby the main shaft is adaptable to be moved vertically relative to the crusher frame.

Information on the position and the rpm of the main shaft can be used as a diagnostic tool to determine the condition of the bushings and the inner eccentric bearings of the crusher and to also diagnose other irregularities in the crusher. Analyzing the movement of the main shaft—both its rpm and its vertical movement—can serve as a means of diagnosing the condition of a gyratory or cone crusher. As more data is available relating to the movement of the main shaft, a more accurate diagnosis can be made of the operating condition of the crusher. For example, measuring the rotational speed of the main shaft, and determining changes from a baseline rpm speed when the machine is under load and not under load, will provide information on the condition of the machine's eccentric bushing. Likewise, recording a change in the position of the main shaft noted as a change in the height of the main shaft from a normal operating setting serves to record any drift of the support cylinder due to normal leakage of hydraulic oil as well as determining if a tramp event occurred, and can further determine if adjustments must be made to the height of the main shaft to maintain correct product sizes. Additionally, data relating to the direction of rotation i.e., either clockwise or counterclockwise, and any change in the tilt of the main shaft from its normal position can also be used to interpret rotational speed data and relate it to the overall crusher condition.

A method of measuring axial height of the main shaft of a gyratory crusher utilizing a sensor located at the bottom of the main shaft by measuring the location of the hydraulic support piston is known in the art. The sensor does not measure any other aspect of the movement of the main shaft. Because of its location, it is difficult and potentially dangerous to gain access to such sensors for maintenance or other purposes.

It is an object of this invention to have a diagnostic detection apparatus and method of monitoring a number of variables relating to the movement of the crusher's main shaft. It is a further object to utilize a single emitting transducer, a single target, and a single set of data to analyze all pertinent aspects relating to the movement of the crusher's main shaft.

DESCRIPTION OF THE DRAWINGS

The above and other objects, features, and advantages will become more readily apparent from the following description, reference being made to the accompanying drawing in which.

The figures are not necessarily drawn to scale.

DESCRIPTION OF THE INVENTION

Figure 1:
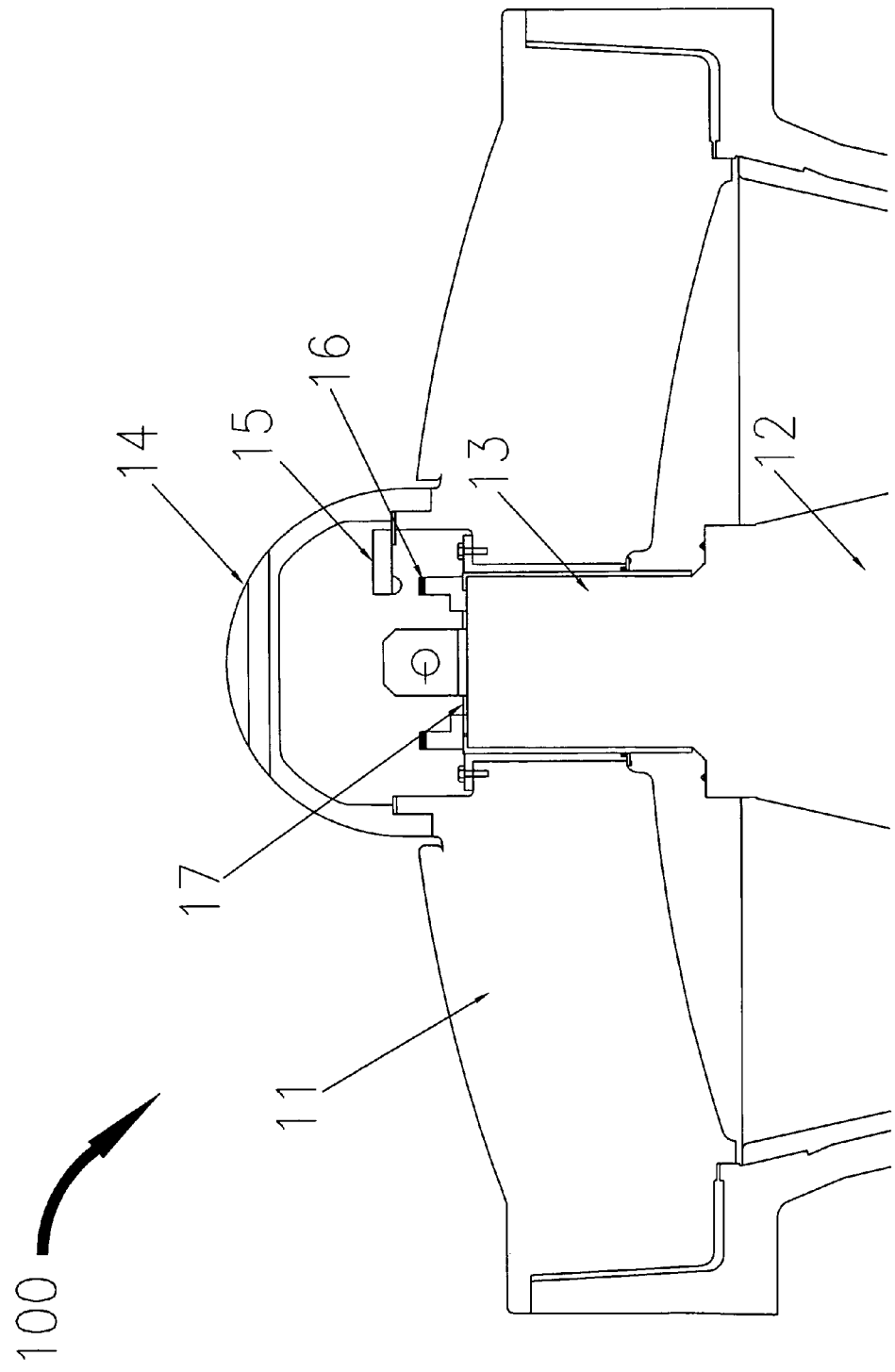
FIG. 1 illustrates one-preferred embodiment of the invention as a schematic cut away side-view of the upper portion of a crusher of the invention.

Referring to the drawings by characters of reference, and to FIG. 1, top portion 100 of a gyratory crusher is depicted. Spider 11 extends across the top of shell 1 to form a support for the gyratory crushing member 12, the upper portion of which is shown and which is a main shaft assembly comprised of the main shaft surrounded by a mantle which functions as a crushing surface. The central portion of the spider is adjacent to the upper end 13 of the main shaft. Upper end 13 is protected by a spider cap 14, which depending on the placement of the detection device of the present invention also can function as a protective cap for said device. In the depicted embodiment inside the spider cap there is mounted a sensor means comprising a stationary distance transducer 15 which in the depicted embodiment is mounted to the inside wall of the spider cap. It is a preferred feature of this invention that the transducer is located in an upper area of the main shaft and can be accessed by removing the spider cap of the gyratory or cone crusher. The transducer is utilized to determine the distance from the transducer to a receiving surface on a target located in the proximity of the upper main shaft of the crusher. Transducer 15 directs a signal, either continuously or based upon an external trigger event, at predetermined intervals to a target 16, which in the depicted embodiment is mounted on top surface 17 of the upper end 13 of main shaft 12. Target 16 has at least one signal receiving surface or site. In one embodiment of the invention, such as when a laser transducer is utilized, the transmitted signal hits at least one point on a signal receiving surface of target 16 and is thereafter reflected back in each instance to a stationary receiving transducer. In another embodiment, such as when an optical transducer is utilized, the signal "reads" the receiving surface and uses the resulting information to determine the distance from the transducer to each receiving surface on the target.

Figure 2:
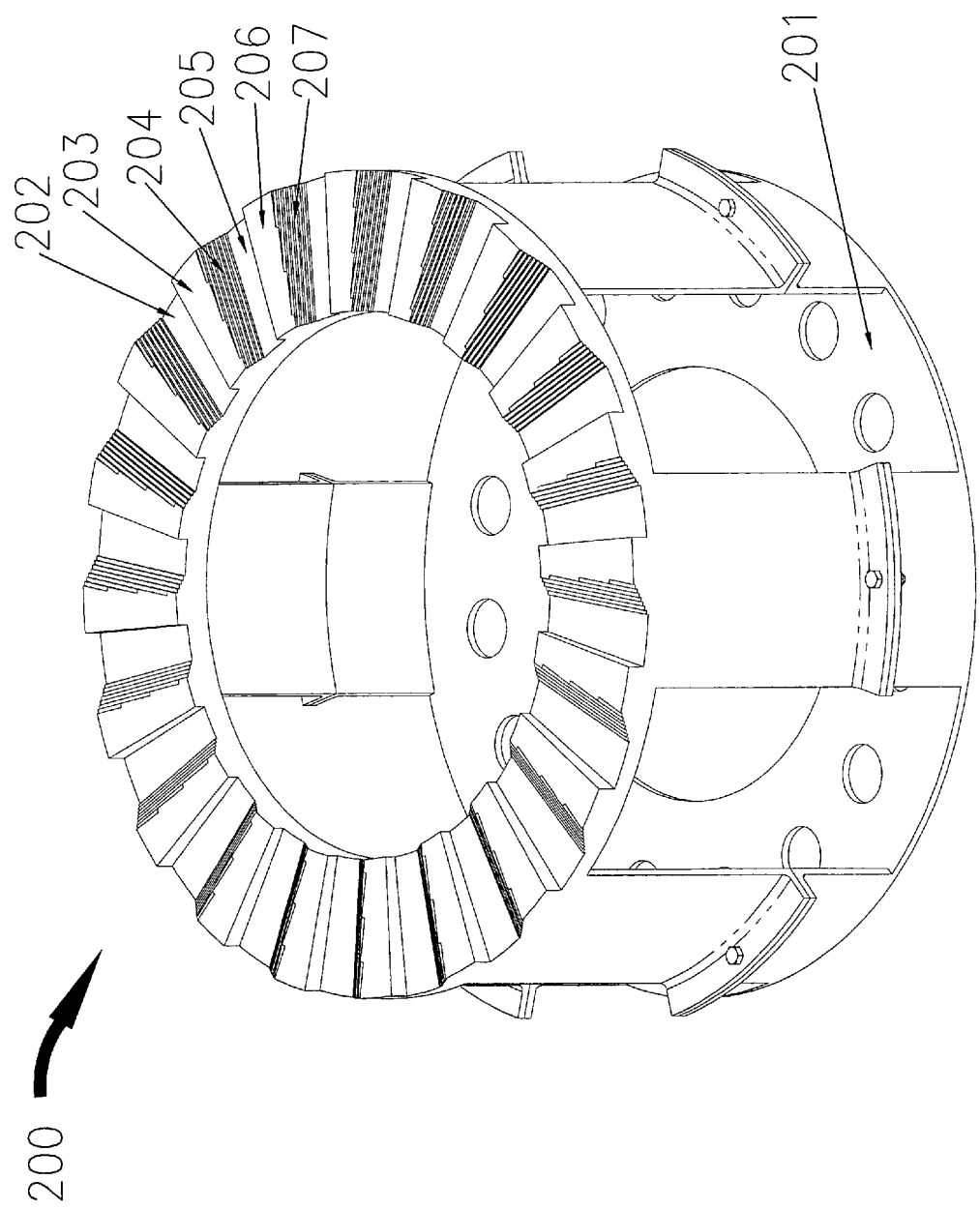
FIG. 2 illustrates a top view of one embodiment of a target that can be utilized in the diagnostic detection apparatus of present invention.

The embodiment in FIGS. 1 and 2 are directed to systems in which a reflective target is utilized, such as with a laser transducer. In the depicted embodiment transducer 15 functions as both an emitting and receiving transducer, although separate transducers can be utilized for such purposes. Transducer 15 receives on a continuous basis a reflected signal back from the target. The number of points on any given surface that reflects a signal will depend on the frequency with which the signal is being transmitted. Data regarding the interval between the time a given signal is transmitted and the return of the corresponding reflected signal for many successive rotations of the main shaft is recorded and analyzed by a PLC or other processing means. With the speed at which the signal travels and the distance between the transmitting transducer and the receiving transducer (if separate transducers are utilized for such purposes) being known factors, by calculating the time interval between when a given signal is initially directed at the target and when its reflected signal is received by the transducer, the distance between the transmitting (and/or the receiving) transducer and a given signal reflective surface on the target for successive rotations of the main shaft is known to a high degree of precision. When an optical transducer is utilized, the target can be, for example, in the nature of a bar code or a series of figures of any size or shapes that can be "read" by the sensor. How a given shape is read by the sensor, that is, its relative size to the sensor, will change based on the distance of the sensor to the target and this information when interpreted by a processor will be utilized to determine the distance of the optical transducer from a given position on the target.

In effect a series of data of a single sensor means comprising a continuous series of measurements of the distance from the sensor means to one or more reflective surfaces on the target will be generated using a processing means. This data can be read manually to determine various motion parameters of the main shaft of the crusher. Preferably the processing means can be programmed to interpret the data to determine such motion parameters in the form of the rotational speed and direction and the height and tilt of the main shaft of the crusher. For example, if there is only one receiving surface on the target, or if the processor is programmed to note the frequency of passage over a given time of a specific receiving surface (such as, when a laser sensor is utilized, the highest reflective surface on a target) than the rpm of the main shaft is readily calculated by the processor means, assuming that the target rotates with and otherwise moves in unison with the rotation of the main shaft. Likewise, if the distance between the transmitting transducer and receiving surface is measured at the time of start up, any changes in such distance over the operational life of the crusher will be immediately apparent and will correspond to the relative movement of the crusher's main shaft.

FIG. 2 illustrates one example of a target 200 that can be utilized in the present invention. Obviously, the nature of the target will change depending on the nature of the signal (laser, ultrasonic, optical or inductive) emitted. Target 200 is applicable for sensor means that utilized a reflective target and signal and therefore contains a plurality of surfaces capable of reflecting the signal back to the transducer.

Target 200 has mounting plate 201 which, for this particular embodiment is attached to top surface 17 of the upper end 13 of main shaft 12. Target 200 has a plurality of signal reflective surfaces, 202, 203, 204, 205, 206, 207 etc. which may or may not be arranged in a repeated pattern. It is preferred that a signal is sent to the target on a continuous basis at a frequency such that each reflective surface will be impacted by the signal at least once per every rotation of the target. The data received and interpreted by the processing means will reveal the distance from the sensor means to one or more reflective surfaces and a review of such distances over time can be further utilized to provide additional information on the movement of the main shaft. For example, if the data regarding distances from a given surface or series of surfaces over time shows an upward movement for such surface or surfaces in conjunction with the downward movement of another surface or series of surfaces when both are compared to a base standard will indicate a change in the tilt of the main shaft from its original position. Further since specific distances between the sensor mean and the target will correlate to specific surfaces on the target, a reverse in the order that a grouping of distances are presented in a given set of data will indicate a change in direction of rotation of the main shaft.

Although the target depicted in FIG. 2 is circular, a suitable target can be designed in any of a number of configurations. For instance, it can be one or more arcs of a circle. The target can be a reflective pattern of sites, such as a reflective etching. As indicated, for optical sensors the target can be a series of figures as simple as a one or more bars or they can be of more elaborate shapes. If only the rpm and the height of the shaft have to be calculated, the target need only have a single signal receiving surface. Whereas in the embodiment of FIG. 2 (in which the target is situated on top of the main shaft of the crusher) the signal emitted by the transducer will be directed downward to a target consisting of a series of reflective surfaces in the form of peaks and valleys, other locations of the transducer and configurations of the target are within the scope of the invention. For example, the transducer can be placed so as to direct a signal essentially horizontally at a target placed on the side of the upper area of the main shaft. In addition, a target may be placed on a extension of the shaft (such as on a cylinder placed on top of the main shaft), or, depending on the type of signal utilized, may consist of a series of engravings in the side or the top of the shaft or a series of colored or other distinctive bands.

In one embodiment, the sensor of the present invention will be arranged to operate whenever the crusher is powered on. Alternatively, the sensor can be triggered to turned on and/or off on an intermittent basis, such as automatically based on an external event, a condition in the operation of the crusher, a predetermined schedule or manually whenever desired by the end user. For example, the sensor can be programmed to be turned on if a motion sensor senses an unusual motion in the crusher, there is a spike or decrease in power drawn, there is an increase in oil temperature, there is pressure relief in a hydraulic cylinder, whenever there is no crushing taking place within the machine or in the event of any other number of factors, all according to the needs of the practitioner. The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A method for utilizing data relating to the distance from a signal emitting and receiving sensor to one or more signal reflective surfaces situated on a target to monitor one or more motion parameters of a main shaft in a gyratory or cone crusher comprising utilizing the sensor to determine a continuous series of measurements of the distance from the sensor that is located apart from the main shaft to said one or more signal reflective surfaces situated on a target, said target located on or adjacent to an upper portion of the main shaft and rotating and otherwise moving in unison with the movement of the main shaft for a series of successive rotations of the main shaft to thereby compile distance data from said sensor to said at least one surface; and utilizing a processing means to analyze the distance data to determine one or more motion parameters of the main shaft;

wherein the distance from the sensor to said one or more signal reflective surfaces is determined by (i) directing a signal from the sensor to said one or more signal reflective surfaces; (ii) recording the elapsed time for a signal to travel from the sensor to at least one signal reflective surface and be reflected back to the sensor for a series of successive rotations of the main shaft; and (iii) from such elapsed time calculating and compiling the distance from said sensor to said at least one surface.

2. The method of claim 1 wherein said sensor directs a signal continuously at predetermined intervals to the target at a frequency sufficient to have the signal impact each receiving surface on the target at least once for each complete rotation of the target relative to the sensor.

3. The method of claim 1 wherein the motion parameters are rotational motion parameters comprising the rpm of the main shaft and the direction of rotation of the main shaft.

4. The method of claim 1 wherein the sensor comprises two transducers that are a signal emitting transducer and a signal receiving transducer.

5. The method of claim 1 wherein the sensor comprises a single transducer that serves to both emit a signal and receive the reflected signal.

6. The method of claim 1 wherein the sensor is selected from the group consisting of a laser sensor, an ultrasonic sensor, an optical sensor or an inductive sensor.

7. The method of claim 1 wherein at least two motion parameters are measured.

8. The method of claim 7 wherein the rpm of the main shaft and a change in the axial position of the main shaft are measured.

9. The method of claim 1 that is operated continuously.

10. The method of claim 1 that is operated intermittently.

11. The method of claim 10 wherein the intermittent operation is triggered by a specific condition in the operation of the crusher.

12. A system for monitoring one or more motion parameters of a main shaft in a gyratory or cone crusher comprising (a) sensor means located apart from the main shaft for transmitting a signal to a signal reflective surface and receiving the reflected return signal and recording the elapsed time between the time a signal is transmitted and its reflected signal is received;

(b) a target containing at least one said signal reflective surface, said signal reflective surface located a distance from said sensor means and said target located on or adjacent to an upper portion of the main shaft and rotating and otherwise moving in unison with the movement of the main shaft and positioned to receive the signal from said sensor means;

(c) processing means to calculate from such elapsed time the distance from the sensor to said signal reflective surface located on the target and to record said distance for each rotation of the main shaft as a set of distance data; and (d) means to analyze the distance data to determine one or more motion parameters of the main shaft.

13. The system of claim 12 wherein the sensor means directs a signal at predetermined intervals to the target at a frequency sufficient to have the signal impact each receiving surface on the target at least once for each complete rotation of the target relative to the sensor means.

14. The system of claim 12 wherein the sensor means comprises two transducers that are a signal emitting transducer and a signal receiving transducer.

15. The system of claim 12 wherein the sensor means comprises a single transducer that serves to both emit a signal and receive the reflected signal.

16. The system of claim 12 wherein the sensor is selected from the group consisting of a laser sensor, an ultrasonic sensor or an inductive sensor.

17. The system of claim 12 wherein the sensor means directs a signal to the target when prompted by an external trigger.

18. The system of claim 17 where the external trigger is actuated by an unusual motion in the crusher.

19. The system of claim 17 wherein the external trigger is actuated by a predetermined crusher operating condition.

20. The system in claim 12 wherein the sensor means directs a signal to the target at predetermined intervals.

21. A system for monitoring one or more motion parameters of a main shaft in a gyratory or cone crusher comprising (a) sensor means located apart from the main shaft and a distance from a signal reflective surface contained on a target for transmitting a signal to said signal receiving surface to determine the distance from the sensor means to said signal receiving surface, said target located on or adjacent to an upper portion of the main shaft and rotating and otherwise moving in unison with the movement of the main shaft and positioned to receive the signal from said sensor means;

(b) processing means to record said distance for each rotation of the main shaft as a set of distance data and to analyze the distance data to determine one or more motion parameters of the main shaft.

* * * * *